United States Patent [19]

Ota

[11] Patent Number: 5,724,172
[45] Date of Patent: Mar. 3, 1998

[54] OPTICAL SCANNING APPARATUS

[75] Inventor: Akira Ota, Saitama, Japan

[73] Assignee: Fuji Xerox Co., Ltd., Tokyo, Japan

[21] Appl. No.: 696,213

[22] Filed: Aug. 13, 1996

Related U.S. Application Data

[62] Division of Ser. No. 56,892, May 5, 1993, Pat. No. 5,546,215.

[30] Foreign Application Priority Data

May 8, 1992 [JP] Japan .................................. 4-116106
May 8, 1992 [JP] Japan .................................. 4-116107

[51] Int. Cl.$^6$ ............................................. G02B 26/08
[52] U.S. Cl. .................... 359/206; 359/205; 359/208; 359/212; 359/216; 359/217
[58] Field of Search .......................... 359/205–208, 359/212–221, 223, 226, 662, 726–728; 347/258–261

[56] References Cited

U.S. PATENT DOCUMENTS

| | | | |
|---|---|---|---|
| 4,247,160 | 1/1981 | Brueggemann | 359/218 |
| 4,512,625 | 4/1985 | Brueggemann | 359/208 |
| 4,789,230 | 12/1988 | Ohta | 359/206 |
| 4,796,962 | 1/1989 | DeJager et al. | 359/206 |

FOREIGN PATENT DOCUMENTS

| | | |
|---|---|---|
| 55-127514 | 10/1980 | Japan . |
| 59-84218 | 5/1984 | Japan . |
| 64-42625 | 2/1989 | Japan . |
| 3-130717 | 6/1991 | Japan . |

*Primary Examiner*—James Phan
*Attorney, Agent, or Firm*—Finnegan, Henderson, Farabow, Garrett & Dunner, L.L.P.

[57] ABSTRACT

An optical scanning apparatus is disclosed which comprises: a polygonal mirror for receiving a laser beam modulated by an image signal and for repetitively deflecting the laser beam by every line of the image signal; a single lens having spherical surfaces for receiving the deflected laser beam by the polygonal mirror; a planoconvex cylindrical lens having a refractive power only in a deflection direction of the laser beam with a convex surface of the planoconvex cylindrical lens being directed toward a plane to be scanned for receiving the laser beam which has passed through the single lens; and a concave cylindrical mirror having a refractive power only in a direction perpendicular to the deflection direction of the laser beam for reflecting the laser beam, which has passed through the planoconvex cylindrical lens, toward the plane to be scanned for forming an image. The second spherical surface of the single lens may be made aspheric. The single lens may be made of plastic.

4 Claims, 11 Drawing Sheets

OPTICAL SCANNING APPARATUS

This is a division of application of application Ser. No. 08/056,892, filed May 5, 1993, now U.S. Pat. No. 5,546,215.

BACKGROUND OF THE INVENTION

The present invention relates to an optical scanning apparatus such as a kind of copying machines or laser printers for scanning laser beams for recording or displaying an image. More particularly, it relates to an optical scanning apparatus having an optical system for focusing laser beams on a scanning surface of a light-sensitive member such as a drum after the laser beams have been deflected by a deflecting means such as a polygonal mirror.

Optical scanning devices are widely used in various copying machines and laser printers in which an electrostatic latent image is formed on a light-sensitive member.

Figure 1:
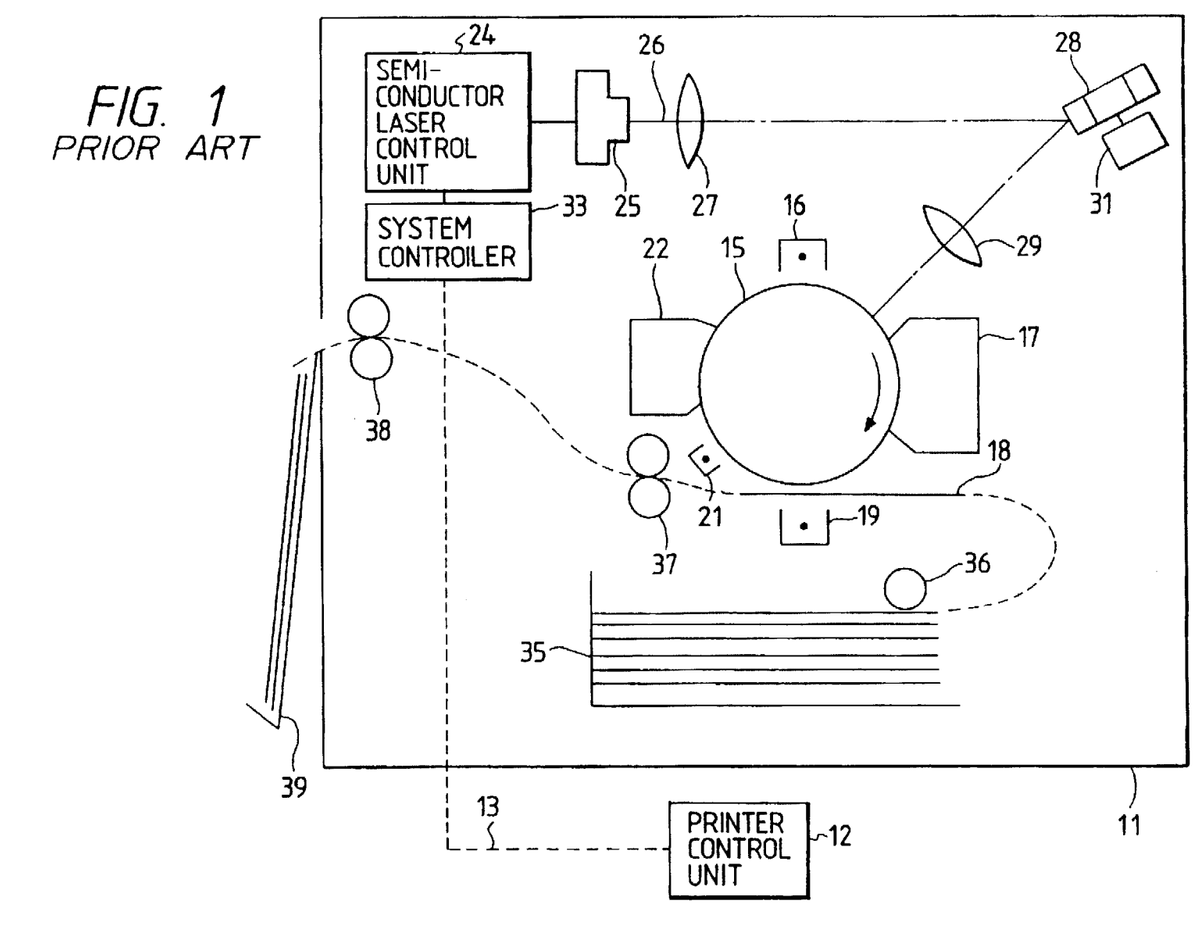
FIG. 1 is a schematic structural view showing a conventional laser printer.

FIG. 1 schematically shows an entire laser printer as an example. The laser printer 11 is electrically connected to a printer controller 12 such as a work station or a computer through a cable 13 so as to receive image data and print an image.

In many cases, such a laser printer 11 is provided with a drum 15 which is to be rotated at a constant speed. Around the circumference of the light-sensitive drum 15, there are provided a charge corotoron 16 for uniformly charging a surface of the drum 15, a developing device 17 for developing an electrostatic latent image, a transfer corotoron 19 for transferring the developed toner image on a recording paper 18, a discharge corotoron 21 for discharging the drum surface after the transfer, and a cleaning device 22 for removing toner residual on the drum surface. A semiconductor laser controller 24 turns on/off or modulates a semiconductor 25 in response to image data. A laser beam 26 outputted from a semiconductor laser 25 is introduced onto a polygonal mirror 28 through a shaping optical system 27 composed of lenses and the like. After the beam is reflected at the polygonal mirror 28, the beam is focused onto the light-sensitive drum 15 through a focusing optical system 29.

Since the polygonal mirror 28 is rotated at a high speed by a polygonal mirror drive motor 31, the reflected laser beam is deflected to scan the drum surface between the charge corotoron 16 and the developing device 17. As a result, an electrostatic latent image is formed on the surface of the light-sensitive drum 15 in response to the image data and is developed by the developing device 17.

The semiconductor laser controller 24 is controlled by a system controller 33 for controlling the overall laser printer 11. A sheet feeder system of the laser printer is also controlled by the system controller 33. Namely, a stack of recording papers 18 received in a cassette tray 35 is fed one by one by a feed roller 35 and advanced along a paper path indicated by dotted lines. The paper is first subjected to the toner image transfer through a gap between the light-sensitive drum 15 and the transfer corotoron 19 and is delivered through a fixing device 37 composed of a pair of rolls, so that a toner image is fixed by heat and pressure. The recording paper on which the image has been formed is discharged from a pair of discharge rolls 38 to be received in the discharge tray 39.

An fθ lens system is widely used in a focusing optical system 29. The fθ lens system has two functions, i.e., to converging laser beams 26 into a light spot on the light-sensitive member, i.e., the light-sensitive drum 15 or the like and to move the light spot at a constant velocity on the light-sensitive drum surface. In many cases, the focusing optical system 29 is arranged so that a position of deflection is conjugate with a position of the light spot on the light-sensitive drum in a plane perpendicular to a surface to be scanned by the laser beam 26. Thus, a so-called surface tilt correcting optical system is optically formed for correcting an inclination of reflective surfaces of the polygonal mirror.

A surface tilt correcting optical system has been conventionally known which is composed of cylindrical lenses or toric lenses. However, in the case where the cylindrical lenses are used, it would be difficult to obtain a good focusing performance. In case of the toric lenses, it is very difficult to produce them.

For instance, Japanese Patent Application Laid-Open No. SHO 55-127514 shows a surface tilt correcting optical system using a cylindrical mirror. Also, Japanese patent Applications Laid-Open Nos. SHO 59-84218 and 64-42625 and HEI 3-130717 show an optical system in combination between a cylindrical mirror and an fθ lens system.

Figure 2:
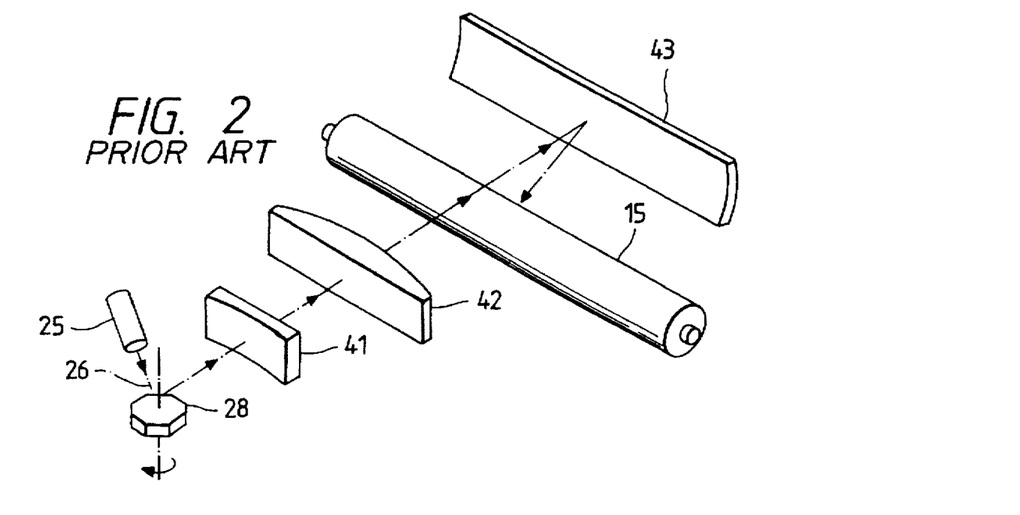
FIG. 2 is a perspective view showing an optical system disclosed in Japanese Patent Application Laid-Open No. SHO 64-42625 wherein a cylindrical mirror and an fθ lens are used in combination.

The combined optical system of the cylindrical mirror and the fθ lens system is shown in FIG. 2 based upon the above-described Japanese Patent Application Laid-Open No. SHO 59-84218. In FIG. 2, the same reference numerals as those in FIG. 1 are used to designate the like members and components and hence the duplication of explanation therefor will be omitted. In the optical scanning system shown in FIG. 2, the laser beam reflected from the polygonal mirror 28 passes through a concave lens element 41 and a convex lens element 42 and thereafter reflected by a concave cylindrical mirror to reach the light-sensitive drum 15 to thereby scan the drum surface by every line in the axial direction of the circumferential surface of the drum 15.

The arrangement of (a) the concave lens element 41, (b) the convex lens element 42 and (c) the concave cylindrical mirror 43 may be made by (a) a spherical single lens, (b) a lens having a cylindrical surface and a spherical surface and (c) a cylindrical mirror, or otherwise by (a) a lens having a cylindrical surface and a planar surface, (b) a lens having a first cylindrical surface and a second cylindrical surface having a refractive power in a direction perpendicular to the first cylindrical surface and (c) a cylindrical mirror, in this order. However, the optical system shown in FIG. 2 suffers from defects that it is difficult to produce the optical elements and the production is costly since the shape of the convex lens element 42 is complicated.

Figure 3:
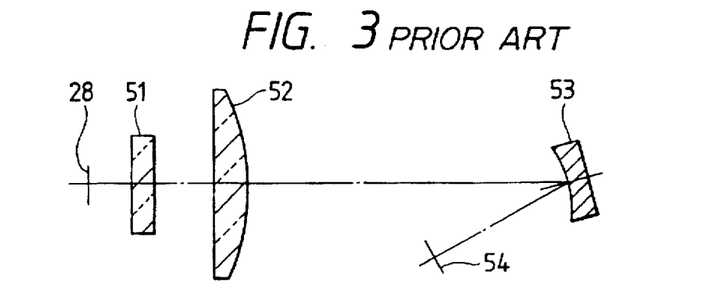
FIG. 3 is a cross-sectional view, in a direction perpendicular to the main scan direction, showing an optical scanning system disclosed in Japanese Patent Application Laid-Open No. SHO 64-42625.

FIG. 3 is a cross-sectional view showing the optical scanning system shown in the above-described Japanese Patent Application Laid-Open No. SHO 64-42625 in a direction perpendicular to the main scanning direction. The optical system is composed, in order from the polygonal mirror 28, of a first lens group 51 having a negative focal length as a whole, a second lens group 52 having a positive focal length as a whole and a concave reflector element 53 having a generating line in the main scanning direction of the focusing surface with its cross section in a direction perpendicular to the main scanning direction having a quadratic contour. The laser beam reflected at the concave reflector element 53 is used to scan the scan surface 54 of the light sensitive member or the like.

Thus, in this optical system, since the fθ lens system is composed of spherical components, it is easy to manufacture the components. However, the second lens group is large in size, which leads to a problem that optical material loss is unduly large in the case where the second lens group is made from a spherical lens.

Figure 4:
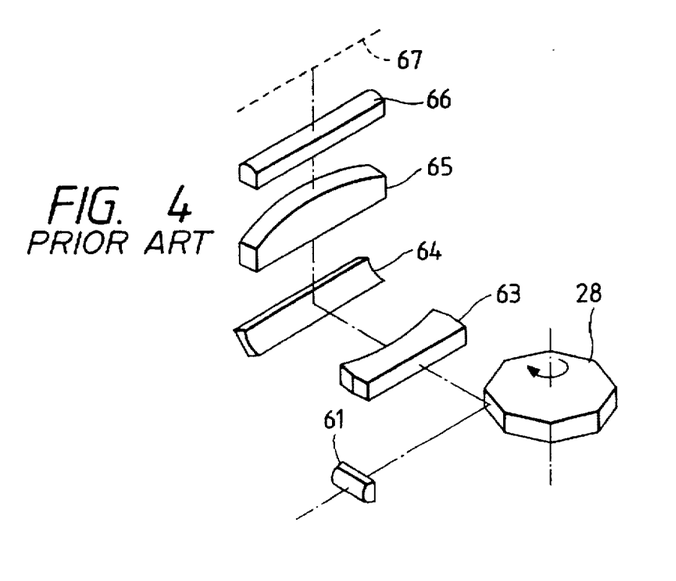
FIG. 4 is a perspective view showing a primary part of an optical scanning system disclosed in Japanese Patent Application Laid-Open No. HEI 3-130717.

FIG. 4 shows a primary part of an optical scanning system disclosed in the above-described Japanese Patent Application Laid-Open No. HEI 3-130717. In this system, the laser beam emitted through a first cylindrical lens 61 is reflected at the polygonal mirror, and passes through a second cylindrical lens 63, a cylindrical mirror 64, a third cylindrical lens 65 and a fourth cylindrical lens 66 in order, thereby scanning the scan surface 67.

In the optical scanning system, a large number of cylindrical lenses are used and it is therefore possible to facilitate the manufacture of the system and to overcome the problem of loss of optical material. However, since the focusing optical system is composed of four components, the number of the optical elements and the cost thereof are increased.

In order to cope with such a problem, it has been proposed to use plastic lenses instead of conventional glass lenses. However, if the glass lenses of such an optical system would be simply replaced by plastic lenses, the refractive indexes of the lenses would be considerably changed due to change in temperature and humidity. Accordingly, it would be impossible to manufacture an optical scanning apparatus which ensures high image quality.

SUMMARY OF THE INVENTION

Accordingly, a primary object of the present invention is to provide an optical scanning apparatus having a lens system having an fθ characteristic without using any complicated lens components.

Another object of the present invention is to provide an optical scanning apparatus having a surface tilt correcting system.

Still another object of the present invention is to provide an optical scanning apparatus in which plastic lenses are used and in addition, the stable performance is insured against change in refractive index. Also, the system may be made in low cost.

According to the present invention, there is provided an optical scanning apparatus comprising; a deflecting and scanning means for repetitively reflecting a laser beam, composed of a modulated image signal, to a light-sensitive member; and an fθ optical system for selecting an optical path for the laser beam so that the laser beam from said deflecting and scanning means is moved at a constant speed on the light-sensitive member; wherein the fθ optical system includes a spherical single lens for receiving the laser beam from said deflecting and scanning means, and a planoconvex cylindrical lens having a refractive power only in a direction of deflection of the laser beam for receiving the laser beam through the spherical single lens; and said spherical single lens and the planoconvex cylindrical lens are located close to said deflecting and scanning means; said optical scanning apparatus further comprising a concave cylindrical mirror having a refractive power only in the direction perpendicular to the deflection direction of the laser beam for reflecting the laser beam through said planoconvex cylindrical lens toward the light-sensitive member; wherein the concave cylindrical mirror is located close to the light-sensitive member.

According to the present invention, there is provided an optical scanning apparatus comprising: a deflecting means for receiving a laser beam modulated by an image signal and for repetitively deflecting the laser beam by every line of the image signal; a single lens having at least one spherical surface for receiving the deflected laser beam by the deflection means; a planoconvex cylindrical lens having a refractive power only in a deflection direction of the laser beam with a convex surface of the planoconvex cylindrical lens being directed toward a plane to be scanned for receiving the laser beam which has passed through the single lens; and a concave cylindrical mirror having a refractive power only in a direction perpendicular to the deflection direction of the laser beam for reflecting the laser beam, which has passed through the planoconvex cylindrical lens, toward the plane to be scanned for forming an image.

The deflection means and the plane to be scanned are kept in optically conjugate relation with each other in a plane of a subscan direction by the single lens and the cylindrical mirror.

According to another aspect of the invention, there is provided an optically scanning apparatus comprising: a deflecting means for receiving a laser beam modulated by an image signal and for repetitively deflecting the laser beam by every line of the image signal; a single lens made of plastic and having a refractive power for receiving the deflected laser beam by the deflection means; a planoconvex cylindrical lens made of glass and having a refractive power, which is greater than that of the single lens, only in a deflection direction of the laser beam with a convex surface of the planoconvex cylindrical lens being directed toward a plane to be scanned for receiving the laser beam which has passed through the single lens; and a concave cylindrical mirror having a refractive power only in a direction perpendicular to the deflection direction of the laser beam for reflecting the laser beam, which has passed through the planoconvex cylindrical lens, toward the plane to be scanned for forming an image.

The concave cylindrical mirror may be made of plastic.

The apparatus may further comprise a cylindrical lens disposed before the deflection means, the cylindrical lens having a positive refractive power in a direction perpendicular to the deflection direction of the laser beam and being made of plastic.

The present inventors have found that even if the fθ lens is composed of the spherical single lens and the planoconvex cylindrical lens, it is possible to cause the curvature of field in the main scan direction to fall within an allowable range. According to the present invention, the spherical single lens and the planoconvex cylindrical lens are located close to the deflector and the concave cylindrical mirror is located close to the light-sensitive member, it is possible to suppress the curvature of field in the main scan direction which caurvature is caused by the arrangement of the spherical single lens and the planoconvex cylindrical lens close to the deflector. Thus, the apparatus may be made small in size. Furthermore, since the deflection surface of the deflector is arranged in optically conjugate relation with the scan surface of the light-sensitive member, it is possible to correct the surface tilt affect of the deflector in the subscan direction.

DESCRIPTION OF THE PREFERRED EMBODIMENTS

The present invention will now be described with reference to the accompanying drawings.

Figure 5:
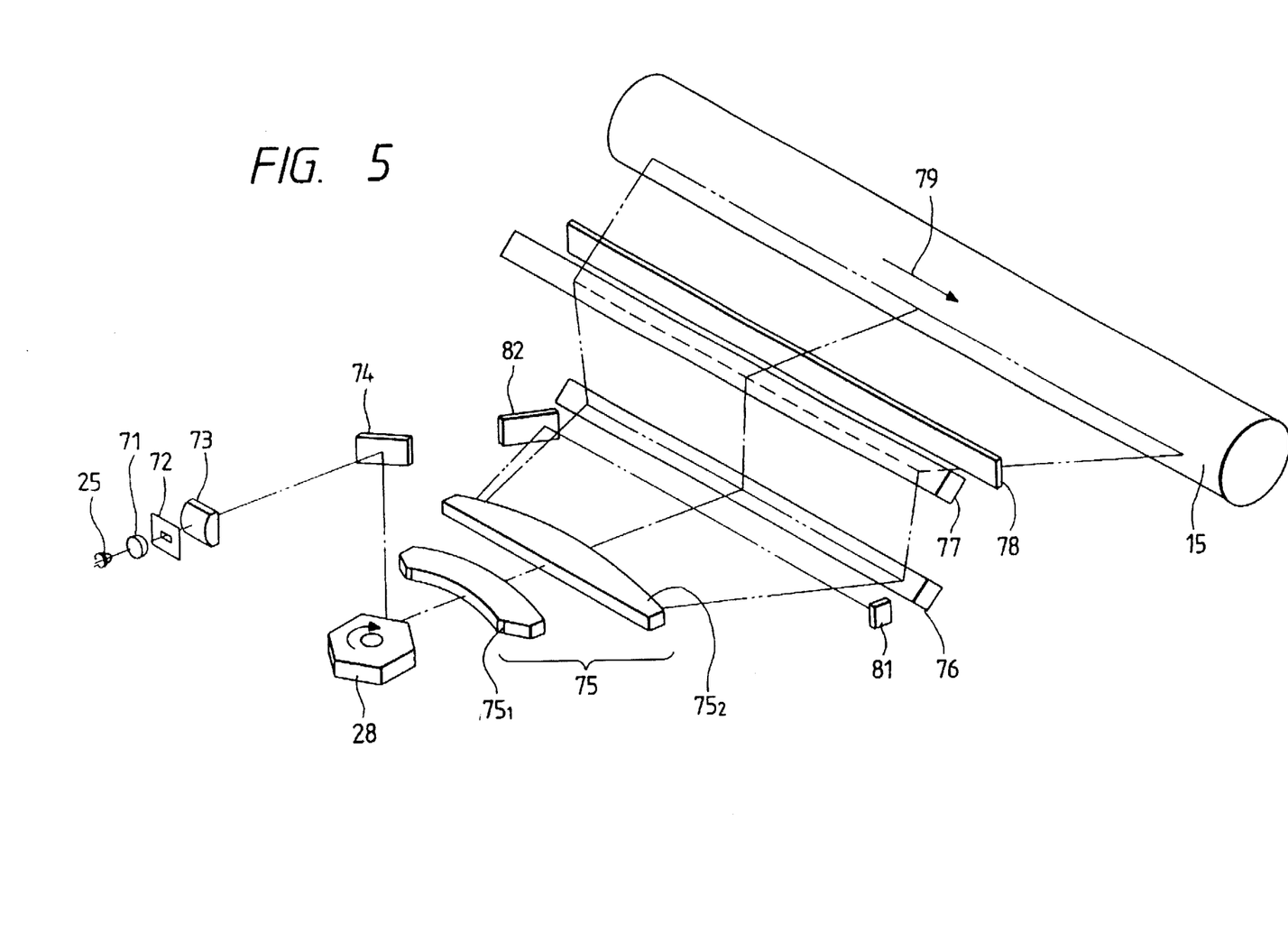
FIG. 5 is a perspective view showing a primary part of an optical scanning system in accordance with one embodiment of the invention.

FIG. 5 shows an optical scanning system in accordance with one embodiment of the invention, in which the same reference numerals as those in FIG. 1 are used to designate the like members or components and hence the duplication of explanation therefor will be omitted. In the optical scanning system, a semiconductor laser 25 is controlled to be turn on/off in response to an image signal by a modulator means (not shown). The laser beams in the form of a divergent light flux thus emitted in response to the image signal from the semiconductor laser 25 are changed into a parallel light flux by a collimator lens 71 to be shaped by an aperture stop 72. The shaped laser beams have passed through a cylindrical lens 73 and have been reflected by a first planar mirror 74 to be introduced into a polygonal mirror 28. The polygonal mirror 28 is rotated at a constant speed in a direction indicated by an arrow to repeatedly deflect the laser beams in correspondence with each line of the image signal.

The deflected laser beams are focused on a light-sensitive drum 15 through an fθ lens system 75, a second planer mirror 76, a cylindrical mirror 77 and a dust-proof window 78. The fθ lens system 75 is composed of a first lens $75_1$ and a second lens $75_2$. The dust-proof window 78 is needed because parts except for the replaceable light sensitive drum 15 are encased in a sealed box (not shown). The dust-proof window 78 is composed of a transparent glass plate through which the laser beams are to be directed from the box to the light-sensitive drum 15. The dust-proof window 78 is inclined at an angle 5°–6° or more relative to a plane defined by the deflected laser beams whereby it is possible to prevent a multiple interference of the laser beams within the window.

A spot of the laser beams formed on the light-sensitive drum 15 by focusing is moved substantially at a constant velocity by the action of the fθ lens system 75. Thus, after the scanning operation corresponding to one line has been carried out, the deflection of laser beams by the next surface of the polygonal mirror 28 causes a scan corresponding to the next line. This operation is repeated in the same way.

Incidentally, in order to set up an initial position on a line where a record of an image is effected during the scanning operation, an SOS (Start of Scan) sensor 81 is disposed as shown. The laser beams reflected at a third planar mirror 82 via the fθ lens system 75 are introduced into the SOS sensor 81. In a predetermined period of time after this, a modulation of the image signal for each line is started.

In the thus arranged optical scanning apparatus, it is possible to locate the reflecting surface of the polygonal mirror 28 and the light spot on the light-sensitive drum 15 substantially in a conjugate relation with respect to the subscan direction of the laser beams. Accordingly, it is possible to suppress displacement or offset of the spot in the subscan direction on the light-sensitive drum 15.

Figure 6:
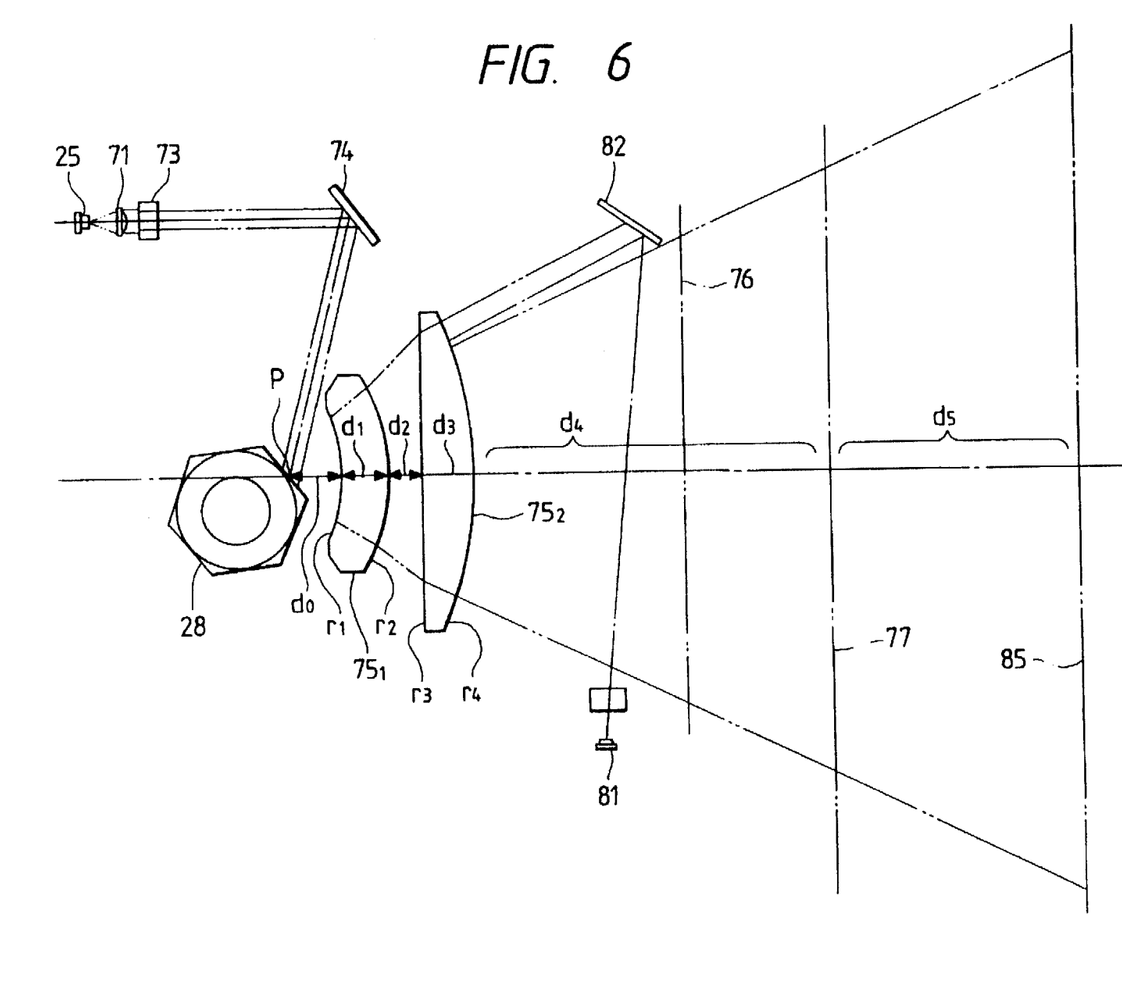
FIG. 6 is an illustration of the primary part of the optical scanning system, shown in FIG. 5, taken along the scan plane of the laser beam.

FIG. 6 is a cross-sectional view, in the main scan direction, showing a primary part of the optical scanning system shown in FIG. 1. The first lens $75_1$ of the fθ lens system 75 is a single lens element. The second lens $75_2$ thereof is a lens having a planar surface toward the polygonal mirror 28 and a cylindrical convex surface on the opposite side.

Figure 7:
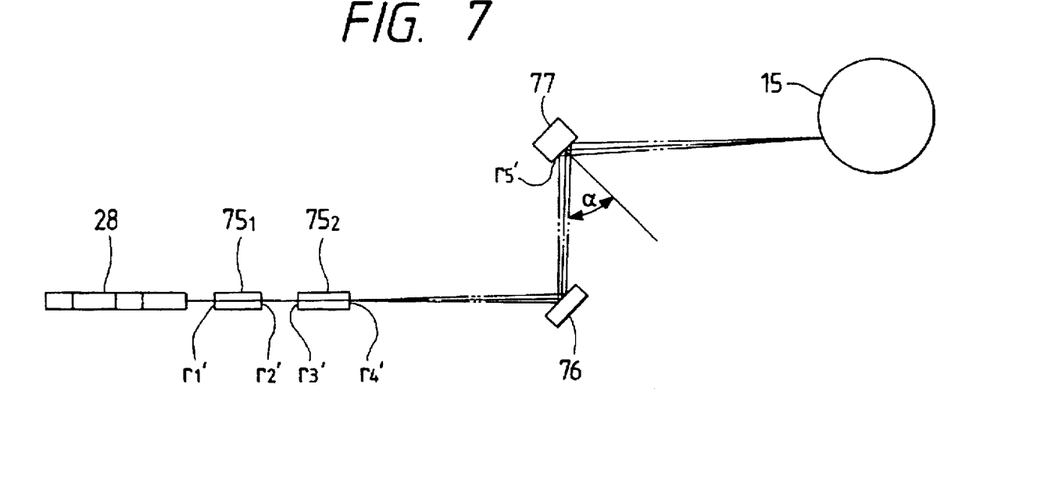
FIG. 7 is an illustration of the primary part of the optical scanning system, shown in FIG. 5, taken along a plane perpendicular to the main scan plane of the laser beam.

FIG. 7 shows the primary part of the scanning system in cross section taken along a plane perpendicular to the main scan direction of the laser beams.

As is apparent from FIG. 6, the region of deflection of the laser beams is spread in accordance with a distance away from the polygonal mirror 28. As a result, a size of the second lens $75_2$ is larger than that of the first lens $75_1$. However, since the second lens $75_2$ is a cylindrical lens, it is easy to manufacture it.

Figures 8, 9:
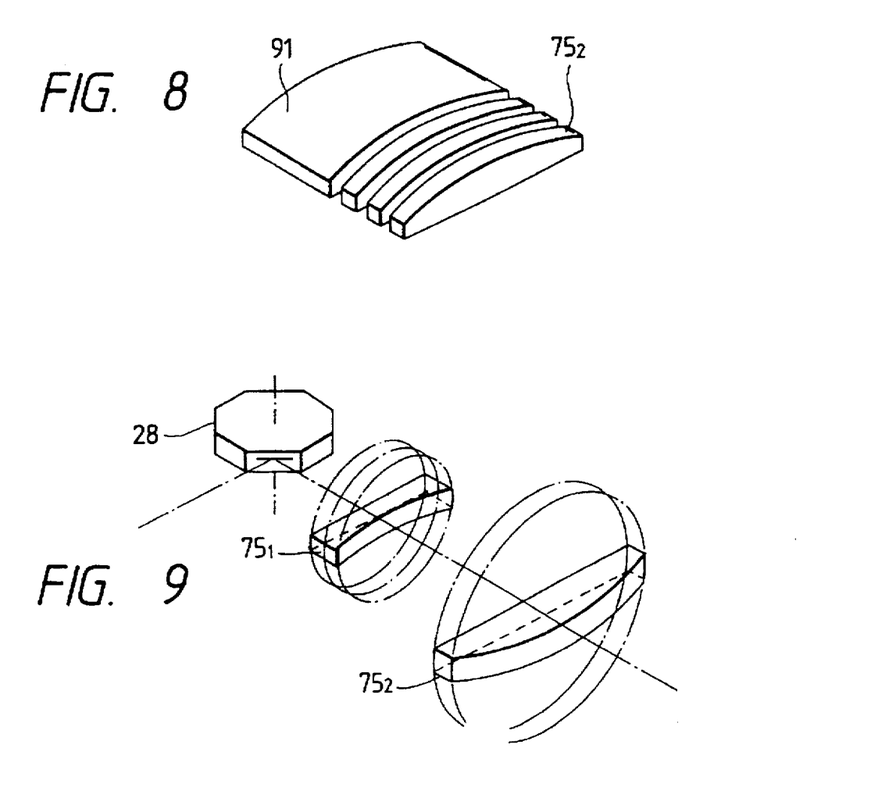
FIG. 8 is a perspective view showing a theory of manufacture of planoconvex lens components.
FIG. 9 is a perspective view showing a state of the lens manufacture in the case where the laser beam passes through two spherical lenses after the reflection at the polygonal mirror.
Figure 10A:
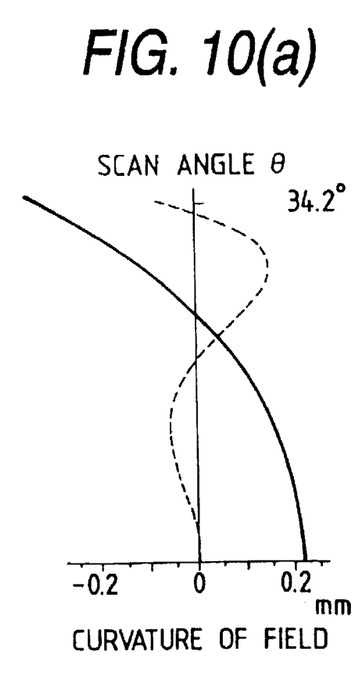
FIGS. 10(a) and 10(b) are graphs showing curvature of image field and fθ characteristics with respect to a scan angle in accordance with Example 1 of the invention.
Figure 10B:
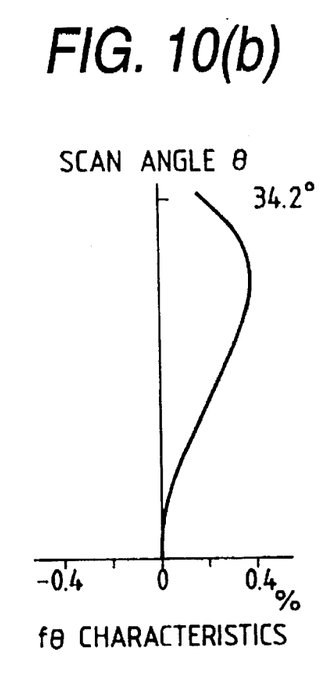
Figure 11A:
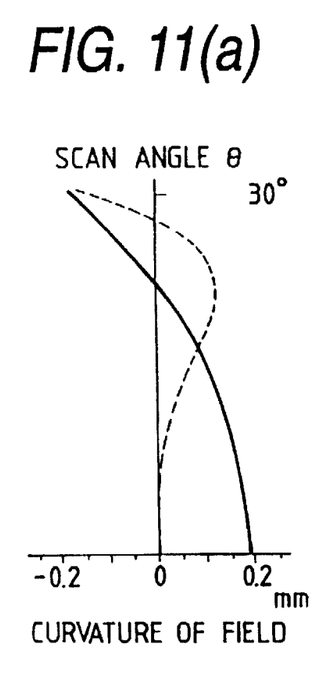
FIGS. 11(a) and 11(b) are graphs showing curvature of image field and fθ characteristics with respect to a scan angle in accordance with Example 2 of the invention.
Figure 11B:
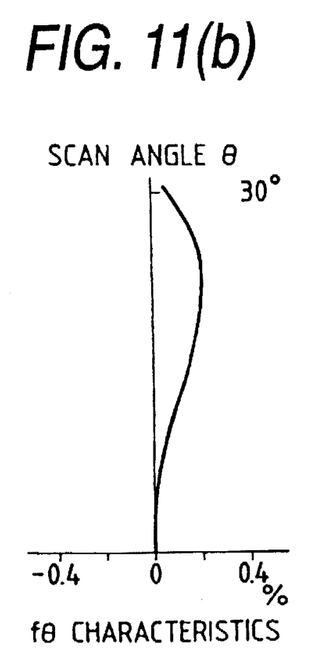
Figure 12A:
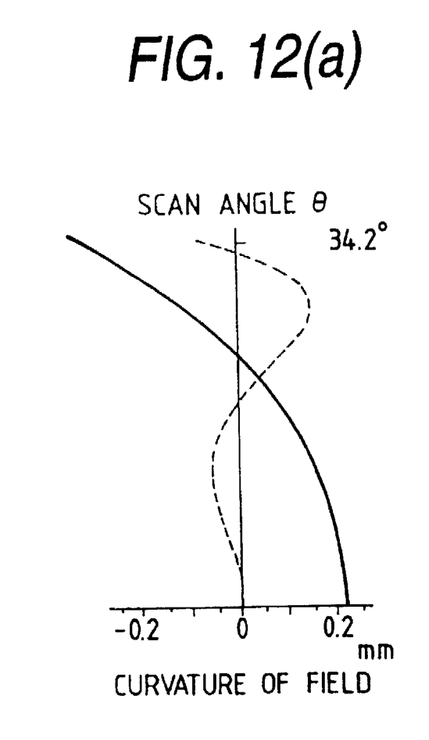
FIGS. 12(a) and 12(b) graphs showing curvature of image field and fθ characteristics with respect to a scan angle in accordance with Example 3 of the invention.
Figure 12B:
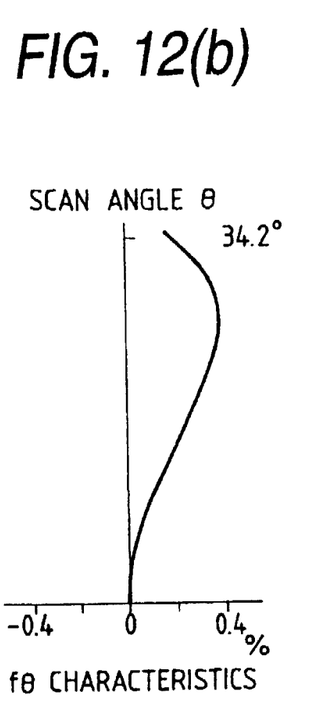
Figure 13A:
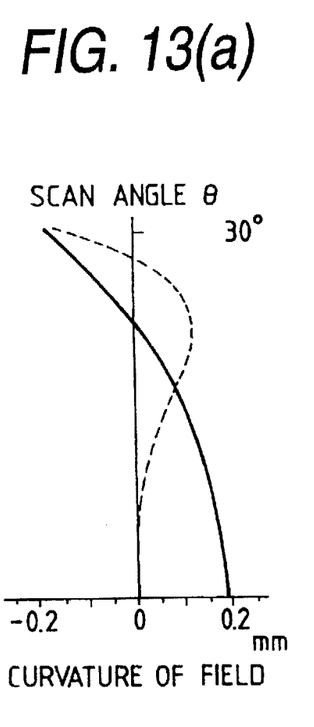
FIGS. 13(a) and 13(b) graphs showing curvature of image field and fθ characteristics with respect to a scan angle in accordance with Example 4 of the invention.
Figure 13B:
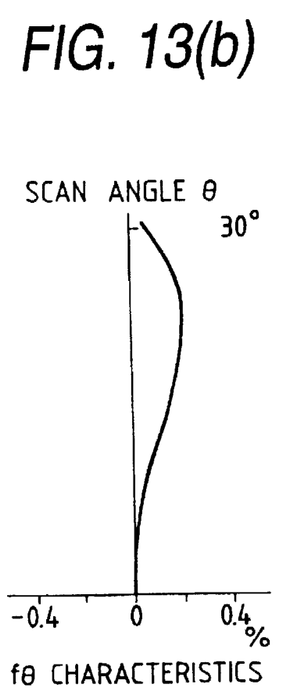
Figure 14A:
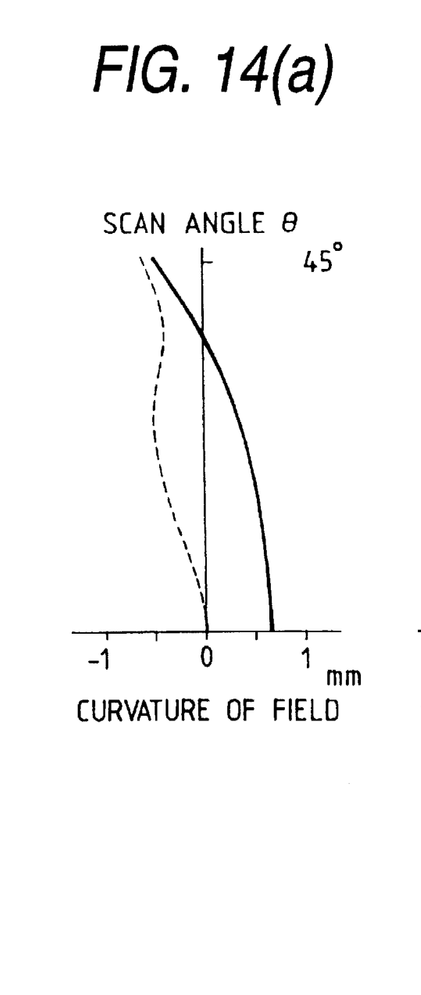
FIGS. 14(a) and 14(b) graphs showing curvature of image field and fθ characteristics with respect to a scan angle an accordance with Example 5 of the invention.
Figure 14B:
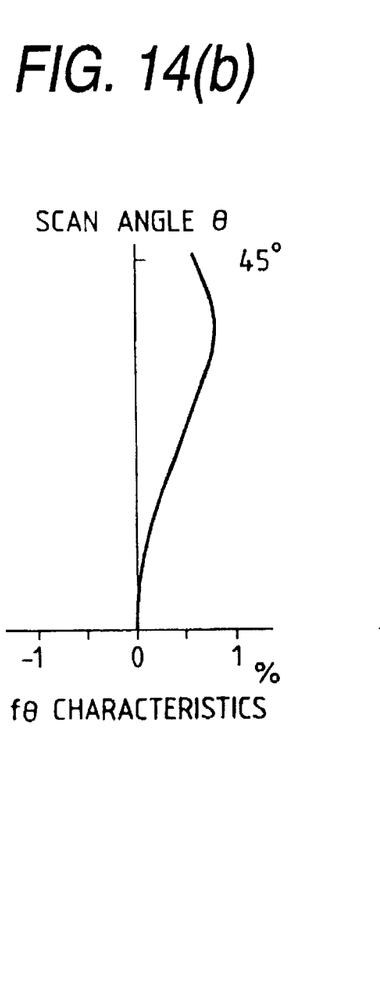
Figure 15A:
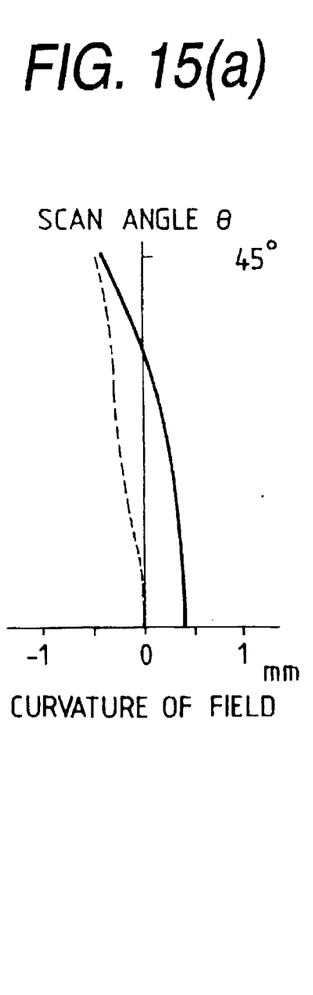
FIGS. 15(a) and 15(b) graphs showing curvature of image field and fθ characteristics with respect to a scan angle in accordance with Example 6 of the invention.
Figure 15B:
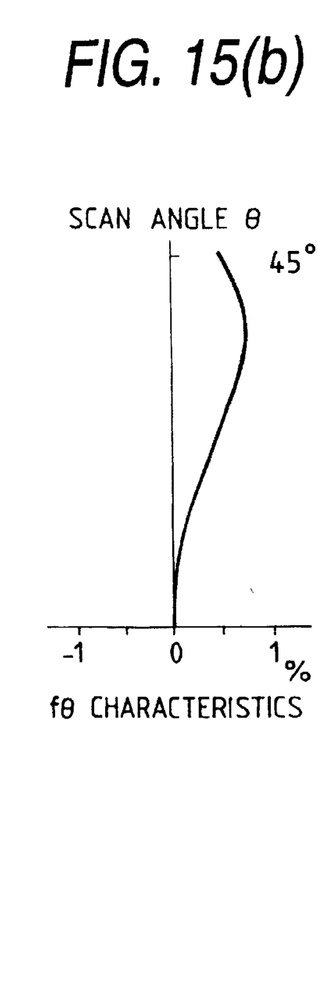
Figure 16A:
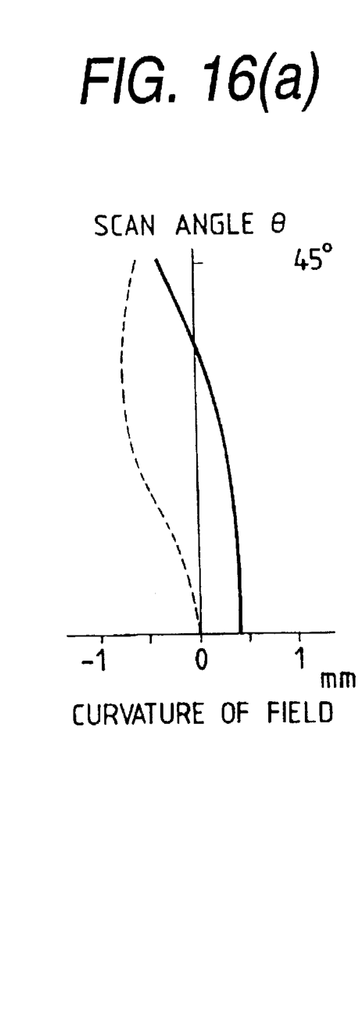
FIGS. 16(a) and 16(b) graphs showing curvature of image field and fθ characteristics with respect to a scan angle an accordance with Example 7 of the invention.
Figure 16B:
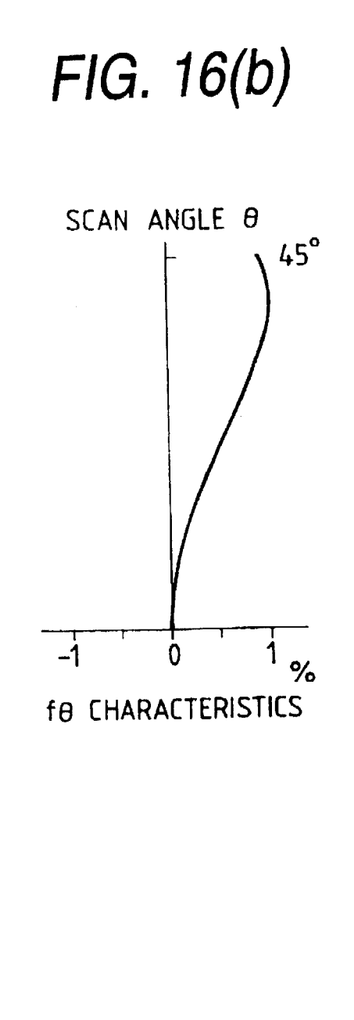
Figure 17A:
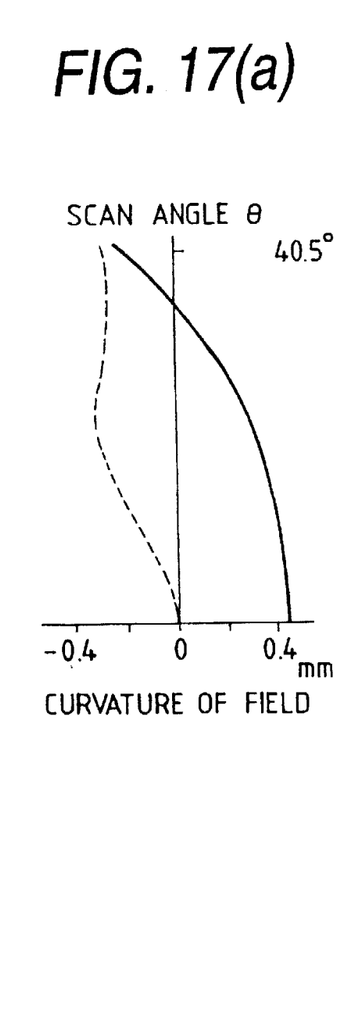
FIGS. 17(a) and 17(b) graphs showing curvature of image field and fθ characteristics with respect to a scan angle in accordance with Example 8 of the invention.
Figure 17B:
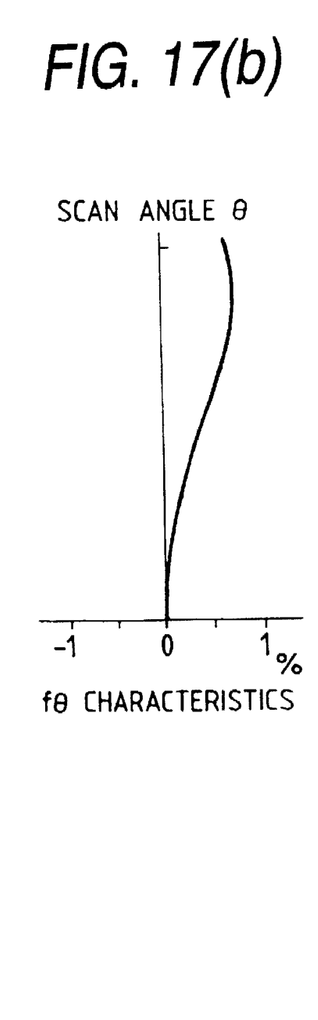
Figure 18A:
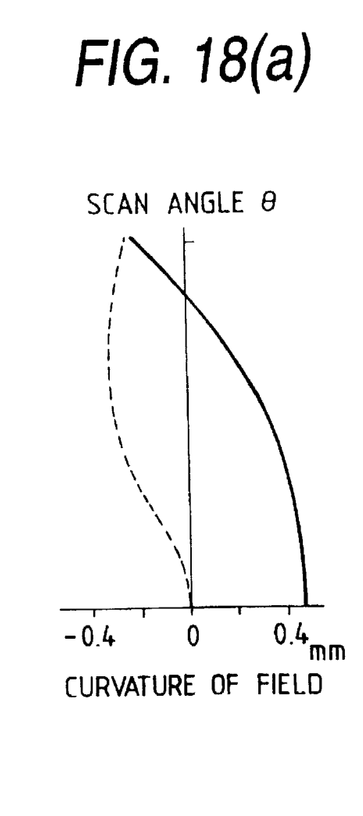
FIGS. 18(a) and 18(b) graphs showing curvature of image field and fθ characteristics with respect to a scan angle in accordance with Example 9 of the invention.
Figure 18B:
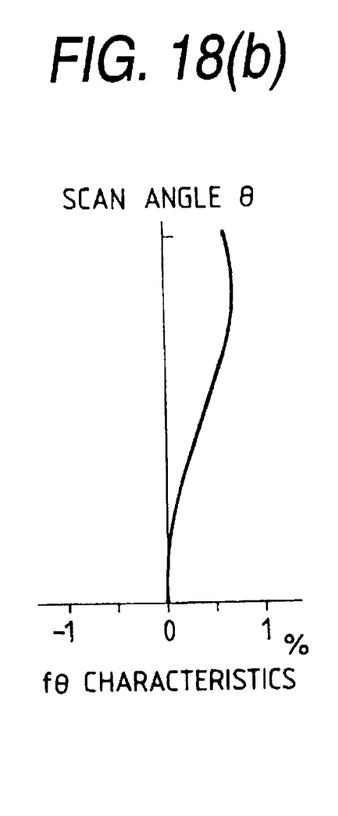

FIG. 8 shows a method for manufacturing such a planoconvex cylindrical lens in principle. More specifically, a single planoconvex cylindrical lens 91 is first produced, and then is cut at a constant interval to thereby manufacture a large number of second lenses $75_2$. It is therefore possible to reduce a cost per one lens $75_2$.

FIG. 9 shows a lens manufacturing method in contrast to the method shown in FIG. 8, assuming that the laser beams reflected from the polygonal mirror pass through two spherical lenses. If the second lens $75_2'$ is made by cutting such a single spherical lens, loss of optical material is noticeable. On the other hand, since the first lens $75_1$ is small in size, the loss of optical material is small. Also, according to up-to-date production technique standards, the machining of spherical surfaces is easier than that of cylindrical surfaces and it is possible to insure high precision by the spherical surface machining. Thus, a lens made by cutting the spherical lens may be used as the first lens $75_1$.

Numerical data including specific parameters for the optical scanning system shown in FIG. 6 in accordance with the present invention will be described. In FIG. 6, $d_0$ is the distance from the deflection point P of the laser beam to the first lens $75_1$, $d_2$, $d_2$ and $d_3$ are the distances among the surfaces of the first lens $75_1$ and the second lens $75_2$, $d_4$ is the distance from the second lens $75_2$ to the cylindrical mirror 77, $d_5$ is the distance from the cylindrical mirror 77 to the scanned surface 85 of the light-sensitive drum 15, and $r_1$, $r_2$, $r_3$ and $r_4$ are the radii of curvature of the surfaces of the first and second lenses $75_1$ and $75_2$ in the scan plane.

In FIG. 7, $r_1'$, $r_2'$, $r_3'$ and $r_4'$ are the radii of curvature of the surfaces of the first and second lenses in the plane perpendicular to the scan plane, and $r_5'$ is the radius of curvature of the cylindrical mirror 77. Further, $n_1$ and $n_2$ are the refractive indexes of the first and second lenses $75_1$ and $75_2$. WL is the wavelength of the beam. $\alpha$ is the inclination angle relative to the optical axis of the cylindrical mirror 77. $f_1$ and $f_2$ are the focal lengths of the first and second lenses $75_1$ and $75_2$. f is the resultant focal length of the first and second lenses $75_1$ and $75_2$. The numerical values are represented in terms of f=100 mm.

In the following examples, with respect to the location of the cylindrical mirror 77, the surface distance $d_5$ is 40 mm, and the inclination angle $\alpha$ relative to the optical axis is fixed at 45°. These values as well as the radius $r_5'$ of curvature may be varied as desired in view of the change of the overall layout of the optical system. As a matter of fact, in Example 1, if the resultant focal length f is about 300 mm, it is possible to realize an optical system for scanning a short side of a paper size B3. In the same way, in Example 2, if the resultant focal length f is about 290 mm, it is possible to realize an optical system for scanning a short side of a paper size A3, in Example 3, if the resultant focal length f is about 150 mm, it is possible to realize an optical system for scanning a short side of paper size A4, in Example 4, if the resultant focal length is about 180 mm, it is possible to realize an optical system for scanning a short side of paper size A3, and in Examples 5–7, if the resultant focal length f is about 140 mm, it is possible to realize an optical system for scanning a short side of paper size A4.

EXAMPLE 1

| | | |
|---|---|---|
| f = 100 | $f_1$ = −112.0523 | $f_2$ = 59.6694 |
| WL = 632.8 (nm) | | $\theta$ = 34.2° |
| | $d_0$ = 6.225322 | |
| $r_1, r_1'$ = −81.02350 | $d_1$ = 1.310594 | $N_1$ = 1.723086 |
| $r_2, r_2'$ = ∞ | $d_2$ = 10.484752 | |
| $r_3, r_3'$ = ∞ | $d_3$ = 5.570025 | $N_2$ = 1.723086 |
| $r_4$ = −43.14611 | $d_4$ = 72.920705 | |
| $r_4'$ = ∞ | | |
| $r_5$ = ∞ | $d_5$ = 40 | $\alpha$ = 45° |
| $r_5'$ = −79.5 | | |

EXAMPLE 2

| | | |
|---|---|---|
| f = 100 | $f_1$ = −93.9121 | $f_2$ = 55.9053 |
| WL = 780(nm) | | $\theta$ = 30° |
| | $d_0$ = 5.158075 | |
| $r_1, r_1'$ = −60.86529 | $d_1$ = 2.750973 | $N_1$ = 1.712282 |
| $r_2, r_2'$ = −687.74336 | $d_2$ = 10.316150 | |
| $r_3, r_3'$ = ∞ | $d_3$ = 4.126460 | $N_2$ = 1.712282 |
| $r_4$ = −39.82034 | $d_4$ = 75.430168 | |
| $r_4'$ = ∞ | | |
| $r_5$ = ∞ | $d_5$ = 40 | $\alpha$ = 45° |
| $r_5'$ = −79.8 | | |

EXAMPLE 3

| | | |
|---|---|---|
| f = 100 | $f_1$ = 10029.67 | $f_2$ = 110.3308 |
| WL = 780(nm) | | $\theta$ = 40.5° |
| | $d_0$ = 8.384651 | |
| $r_1, r_1'$ = −30.82737 | $d_1$ = 8.517657 | $N_1$ = 1.511187 |
| $r_2, r_2'$ = −33.50715 | $d_2$ = 5.896840 | |
| $r_3, r_3'$ = ∞ | $d_3$ = 9.172862 | $N_2$ = 1.609116 |
| $r_4$ = −67.20432 | $d_4$ = 69.230787 | |
| $r_4'$ = ∞ | | |
| $r_5$ = ∞ | $d_5$ = 40 | $\alpha$ = 45° |
| $r_5'$ = −80.7 | | |

EXAMPLE 4

| | | |
|---|---|---|
| f = 100 | $f_1$ = 1391.4946 | $f_2$ = 115.0471 |
| WL = 780(nm) | | $\theta$ = 46.4° |
| | $d_0$ = 10.744262 | |
| $r_1, r_1'$ = −33.57804 | $d_1$ = 7.643781 | $N_1$ = 1.511187 |
| $r_2, r_2'$ = −34.53351 | $d_2$ = 6.371255 | |
| $r_3, r_3'$ = ∞ | $d_3$ = 10.373702 | $N_2$ = 1.609116 |
| $r_4$ = −70.07709 | $d_4$ = 66.779246 | |
| $r_4'$ = ∞ | | |
| $r_5$ = ∞ | $d_5$ = 40 | $\alpha$ = 45° |
| $r_5'$ = −81 | | |

EXAMPLE 5

| | | |
|---|---|---|
| f = 100 | $f_1$ = 1615.9506 | $f_2$ = 112.8282 |
| WL = 780(nm) | | $\theta$ = 45° |
| | $d_0$ = 9.453305 | |
| $r_1, r_1'$ = −35.68617 | $d_1$ = 7.271773 | $N_1$ = 1.511187 |
| $r_2, r_2'$ = −36.56628 | $d_2$ = 10.180482 | |
| $r_3, r_3'$ = ∞ | $d_3$ = 10.180482 | $N_2$ = 1.511187 |
| $r_4$ = −57.67627 | $d_4$ = 65.846008 | |
| $r_4'$ = ∞ | | |
| $r_5$ = ∞ | $d_5$ = 40 | $\alpha$ = 45° |
| $r_5'$ = −81.5 | | |

EXAMPLE 6

| | | |
|---|---|---|
| f = 100 | $f_1$ = −7271.6048 | $f_2$ = 111.3595 |
| WL = 780(nm) | | $\theta$ = 45° |
| | $d_0$ = 9.453305 | |
| $r_1, r_1'$ = −23.74214 | $d_1$ = 7.271773 | $N_1$ = 1.712282 |
| $r_2, r_2'$ = −26.89035 | $d_2$ = 5.817419 | |
| $r_3, r_3'$ = ∞ | $d_3$ = 8.726128 | |
| $r_4$ = −77.31935 | $d_4$ = 72.890897 | $N_2$ = 1.712282 |
| $r_4'$ = ∞ | | |
| $r_5$ = ∞ | $d_5$ = 40 | $\alpha$ = 45° |
| $r_5'$ = −81.5 | | |

EXAMPLE 7

| | | |
|---|---|---|
| f = 100 | $f_1$ = 2410.0907 | $f_2$ = 116.2317 |
| WL = 780(nm) | | $\theta$ = 45° |
| | $d_0$ = 9.475708 | |
| $r_1, r_1'$ = −27.31711 | $d_1$ = 9.475708 | $N_1$ = 1.511187 |
| $r_2, r_2'$ = −29.86035 | $d_2$ = 1.442535 | |
| $r_3, r_3'$ = ∞ | $d_3$ = 10.933509 | $N_2$ = 1.712282 |
| $r_4$ = −82.78976 | $d_4$ = 71.408996 | |
| $r_4'$ = ∞ | | |
| $r_5$ = ∞ | $d_5$ = 40 | $\alpha$ = 45° |
| $r_5'$ = −81.0 | | |

FIG. 10 to 16 are graphs showing aberration curves corresponding to Examples 1 to 7, respectively. In these drawings, (a) indicates a curvature of image field with dotted lines indicating a subscan direction and solid lines indicating a main scan direction. (b) indicates fθ characteristics whose calculation result A is given as follows:

$A=\{(h-f\theta)/f\theta\}\times 100(\%)$ where h is the image height.

With respect to the first lens $75_1$, the latter may be made of plastic and hence, there is no limitation in shape in comparison with the glass lens. Also, it is easy to use an aspherical surface for the first lens. Also, the first lens $75_1$ is located closer to the polygonal mirror than the second lens $75_2$, and hence it is possible to make the first lens small in size for insuring mass productability.

Still other examples of the present invention will be explained with numerical data for an optical scanning system referring again to FIG. 6. In the refractive power arrangement of the fθ lens system 75 of the following Examples 8 and 9, the first lens has a small in refractive power and the second lens has a strong positive refractive power in cross section in the main scan plane to thereby realize a wide angle system with a viewing angle of 40° or more. A surface, on the polygonal mirror 28 side, of the first lens $75_1$ is spherical, whereas a surface, on the second lens $75_2$ side, of the first lens $75_1$ is aspherical. In Example 8, the first lens $75_1$ is made of PMMA (polymethylacrylate) and in Example 9, and the first lens $75_1$ is made of polycarbonate. These materials are typical materials for the plastic lenses.

In Examples 8 and 9, if the resultant focal length f is about 150 mm for practical use, it is possible to obtain an optical system suitable for scanning a short side of A4 paper.

EXAMPLE 8

| | | |
|---|---|---|
| f = 100 | $f_1$ = 7951.5036 | $f_2$ = 110.5622 |
| WL = 780 (mn) | | θ = 40.5° |
| | $d_0$ = 8.535521 | |
| $r_1, r_1'$ = −34.58776 | $d_1$ = 9.848678 | $N_1$ = 1.485 |
| $r_2^*, r_2'^*$ = −37.46829 | $d_2$ = 4.46324 | |
| $r_3, r_3'$ = ∞ | $d_3$ = 9.19210 | $N_2$ = 1.609116 |
| $r_4$ = −67.34526 | $d_4$ = 69.171766 | |
| $r_4'$ = ∞ | | |
| $r_5$ = ∞ | $d_5$ = 40 | α = 45° |
| $r_5'$ = −80.7 | | | where asterisk * represents an aspheric surface and is given by the following equation:

$$Z = \frac{ch^2}{1+\sqrt{1-(1+K)c^2h^2}} + Ah^4 + Bh^6 + Ch^8 + Dh^{10} + \ldots \quad (1)$$

where Z is the offset shift in the optical direction and h is a distance from an optical axis. The others parameters take the following numerical values:

C = 1/$r_2$
K = −0.054318
A = 0.212924 × 10$^{-6}$
B = 0.218301 × 10$^{-9}$
C = −0.495744 × 10$^{-11}$
D = 0.946658 × 10$^{-14}$

EXAMPLE 9

| | | |
|---|---|---|
| f = 100 | $f_1$ = 7964.9304 | $f_2$ = 110.5445 |
| WL = 780 (mn) | | θ = 40.5° |
| | $d_0$ = 8.205913 | |
| $r_1, r_1'$ = −32.07496 | $d_1$ = 8.205913 | $N_1$ = 1.572 |
| $r_2^*, r_2'^*$ = −34.81571 | $d_2$ = 6.431941 | |
| $r_3, r_3'$ = ∞ | $d_3$ = 9.190622 | $N_2$ = 1.609116 |
| $r_4$ = −67.33444 | $d_4$ = 69.156565 | |
| $r_4'$ = ∞ | | |
| $r_5$ = ∞ | $d_5$ = 40 | α = 45° |
| $r_5'$ = −80.7 | | | where asterisk * represent an aspheric surface and Z is the offset amount in the optical axis direction. The other parameters take the following numerical values:

C = 1/$r_2$
K = −0.096169
A = 0.292833 × 10$^{-7}$
B = −0.346121 × 10$^{-9}$
C = −0.53605 × 10$^{-11}$
D = 0.141395 × 10$^{-13}$

An incidental light flux is parallel within the main scan plane and is divergent from the deflection point P in the subscan plane. In the aberration curves shown in FIGS. 10 to 16, although the affect of variation of the incidental pupil in accordance with the movement of the reflection point on the polygonal mirror 28 is not considered for the same of simplification, this Would not affect the availability of the present invention at all. In the scanning apparatus, it is possible to adjust the balance of the curvature of image field, the fθ characteristics, and the surface tilt correction performance by somewhat changing the distance $d_5$ from the cylindrical mirror 77 to the scanned surface 85 of the light-sensitive drum for a practical use, or to adjust the balance of the curvature of image field and the surface tilt correction due to the change in incidental light quantity by somewhat changing the distance from the deflection point P of the laser beam to the first lens $75_1$ or the radius $r_5'$ of curvature.

In Examples 8 and 9, the ratio f/$f_1$ of the focal length $f_1$ of the first lens $75_1$ to the resultant focal length f is 0.0126, and the refractive power (i.e., 1/focal length) of the first lens $75_1$ is about 1/100. Since the power of the first lens $75_1$ is small, it is possible to suppress the change in refractive index even if the lens is made of plastic. This will be numerically explained.

When the temperature changes by one degree, the refractive index of the plastic used for the first lens $75_1$ will change by about 1.1/10$^4$. In practical use, when the temperature change is +/−20° C., the refractive index will change within a range of +/−0.0022.

Figure 19A:
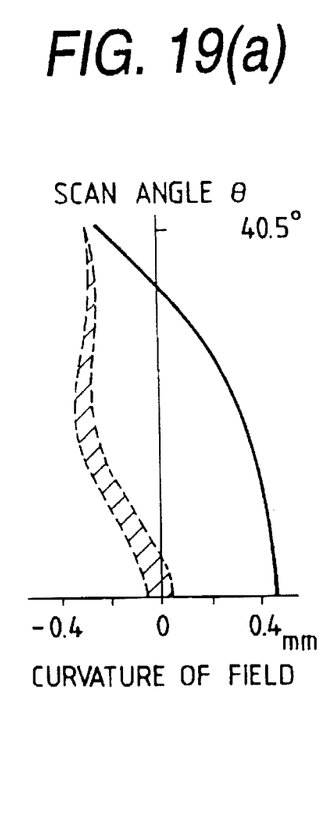
FIGS. 19(a) and 19(b) graphs showing curvature of image field and fθ characteristics with respect to a scan angle an accordance with Example 8 of the invention in the case where the refractive index of the first lens is changed.
Figure 19B:
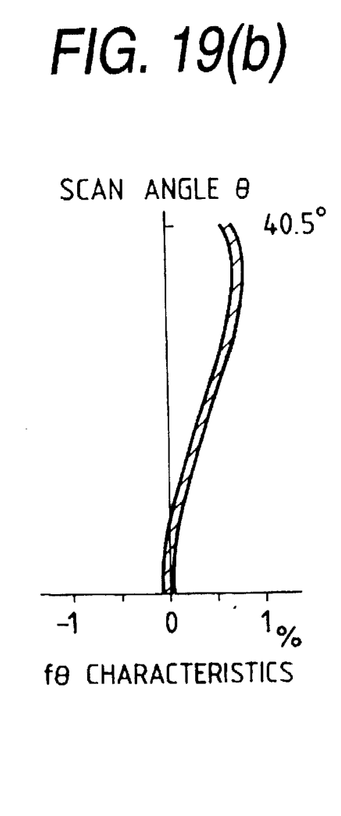

In FIG. 19, the hatched regions show the change due to the temperature change. Thus, the affect to the curvature of image field and the fθ characteristics by using the plastic lens is small. There would be no practical problem.

Figure 20A:
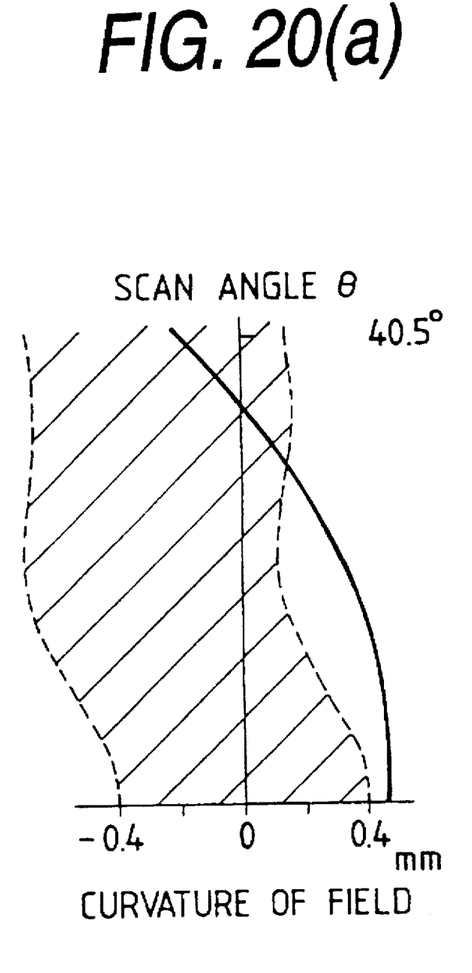
FIGS. 20(a) and 20(b) graphs showing curvature of image field and fθ characteristics with respect to a scan angle in accordance with Example 8 of the invention in the case where the refractive index of the second lens is changed.
Figure 20B:
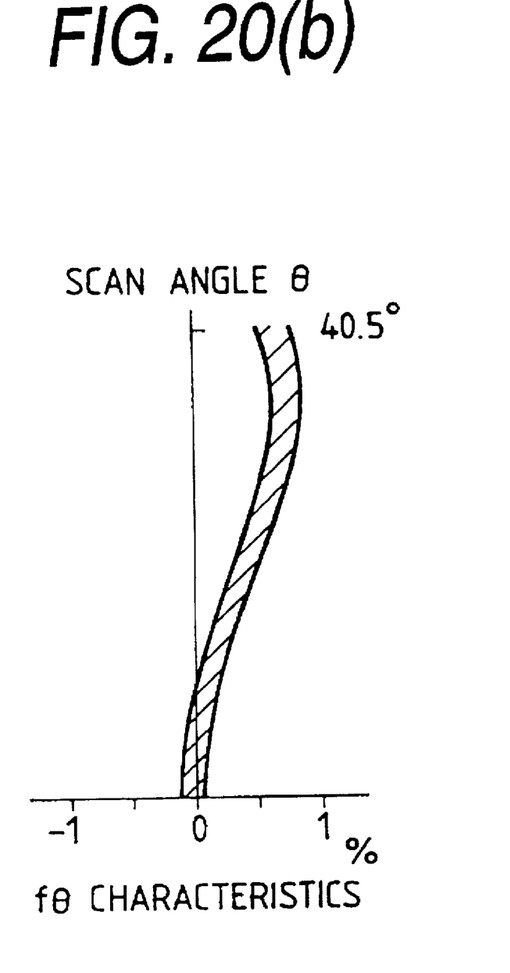

FIG. 20 shows the assumption where the plastic is used for the second lens $75_2$ having the large refractive power. The hatched regions similarly show the like characteristics. In the case shown in FIG. 20, the curvature of image field is considerably changed due to the change in refractive index, to cause a practical problem. Thus, the first lens $75_1$ has a small power and is made of plastic, whereby it is possible to suppress the adverse affect by the change in refractive index. Incidentally, in Example 9, there is no serious problem because the first lens $75_1$ has a small power.

In the foregoing embodiments, the light sensitive-drum is used as a light-sensitive member but it is possible to use other light sensitive members such as light-sensitive belts or webs. Also, the surface to be scanned by the laser beam is not limited to the light sensitive surface but it is possible to scan the display surface of the display device.

Furthermore, in the foregoing embodiments, the semiconductor lasers are used as laser beam generators or oscillators. Of course, the invention is not limited thereto or thereby. By changing the shaping optical system, it is possible to use a gas laser source as a light source. Also, in the embodiments, a window is formed for dust-proof but it is possible to dispense with it as desired.

In Examples 8 and 9, the plastic lens is used in the fθ lens system 75 but it is possible to form, of plastic, the cylindrical mirror 77 and the cylindrical lens 73 interposed between the semiconductor laser 25 and the polygonal mirror. The cylindrical mirror 77 is used to reflect the laser beam and is not subjected to the affect of the change in refractive index. Therefore, there is no problem. Also, since a magnification in the surface tilt correction optical system in which the cylindrical mirror 77 is used is small, even if the cylindrical lens 73 is made of plastic, it is possible to suppress the degradation in focusing performance and hence, there is no serious problem.

According to the present invention, since the concave cylindrical mirror or the cylindrical lens located before the deflection means is made of plastic, it is possible to reduce the weight of the total system.

Also, according to another aspect of the invention, the deflector and the light-sensitive member may be kept in conjugate relation with each other in the subscan plane mainly by using the spherical single lens and the cylindrical mirror to thereby constitute a surface tilt correction optical system and to thereby compensate for the curvature of image field in the subscan direction.

As described above, according to the present invention, the fθ characteristics are ensured by the spherical single lens element and the planoconvex cylindrical lens element and in addition, the planoconvex cylindrical lens element is located far from the deflection means (it should be noted that the scanning light path is diverged in the main scan direction), it is possible to manufacture a light scanning system with high quality in low cost due to the mass production effect of the planoconvex cylindrical lens elements.

What is claimed is:

1. An optical scanning apparatus comprising;

a deflecting and scanning means for repetatively reflecting a laser beam, composed of a modulated image signal, to a light-sensitive member; and an fθ optical system for selecting an optical path for the laser beam so that the laser beam from said deflecting and scanning means is moved at a constant speed on the light-sensitive member;

wherein said fθ optical system includes a spherical single lens for receiving the laser beam from said deflecting and scanning means, and a planoconvex cylindrical lens having a refractive power only in a direction of deflection of the laser beam for receiving the laser beam through said spherical single lens; and said spherical single lens and said planoconvex cylindrical lens are located close to said deflecting and scanning means;

said optical scanning apparatus further comprising a concave cylindrical mirror having a refractive power only in the direction perpendicular to the deflection direction of the laser beam for reflecting the laser beam through said planoconvex cylindrical lens toward the light-sensitive member;

wherein said concave cylindrical mirror is located close to the light-sensitive member.

2. The apparatus according to claim 1, wherein a light deflecting surface of said deflecting and scanning means is arranged in optically conjugate relation with a plane to be scanned of said light-sensitive member.

3. An optical scanning apparatus comprising:

a deflecting means for receiving a laser beam modulated by an image signal and for repetitively deflecting the laser beam by every line of the image signal;

a single lens having at least one spherical surface for receiving the deflected laser beam by the deflection means;

a planoconvex cylindrical lens having a refractive power only in a deflection direction of the laser beam with a convex surface of the planoconvex cylindrical lens being directed toward a plane to be scanned for receiving the laser beam which has passed through said single lens; and a concave cylindrical mirror having a refractive power only in a direction perpendicular to the deflection direction of the laser beam for reflecting the laser beam, which has passed through said planoconvex cylindrical lens, toward the plane to be scanned for forming an image.

4. The apparatus according to claim 3, wherein said deflection means and said plane to be scanned are kept in optically conjugate relation with each other in a plane of a subscan direction by said single lens and said cylindrical mirror.

* * * * *

UNITED STATES PATENT AND TRADEMARK OFFICE
CERTIFICATE OF CORRECTION

PATENT NO.  :   5,724,172
DATED       :   March 03, 1998
INVENTOR(S) :   Akira OTA It is certified that error appears in the above-indentified patent and that said Letters Patent is hereby corrected as shown below:

Claim 1, column 11, line 30, "repetatively" should read --repetitively--.

Signed and Sealed this

Tenth Day of November 1998

Attest:

BRUCE LEHMAN

*Attesting Officer*          *Commissioner of Patents and Trademarks*